US010686261B2

(12) United States Patent
Matsuura (10) Patent No.: US 10,686,261 B2
(45) Date of Patent: Jun. 16, 2020

(54) ELECTRICAL CONNECTION BOX

(71) Applicant: SUMITOMO WIRING SYSTEMS, LTD., Mie (JP)

(72) Inventor: Daisuke Matsuura, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 0 days.

(21) Appl. No.: 16/339,572

(22) PCT Filed: Sep. 22, 2017

(86) PCT No.: PCT/JP2017/034282
§ 371 (c)(1),
(2) Date: Apr. 4, 2019

(87) PCT Pub. No.: WO2018/070216
PCT Pub. Date: Apr. 19, 2018

(65) Prior Publication Data
US 2019/0229439 A1    Jul. 25, 2019

(30) Foreign Application Priority Data

Oct. 13, 2016    (JP) ................................ 2016-201834

(51) Int. Cl.
*H01R 4/30* (2006.01)
*H01R 4/34* (2006.01)
(Continued)

(52) U.S. Cl.
CPC ............... *H01R 4/34* (2013.01); *B60R 16/02* (2013.01); *B60R 16/0238* (2013.01); *H01R 4/18* (2013.01); *H02G 3/16* (2013.01)

(58) Field of Classification Search
CPC . H05K 7/026; H01R 4/34; H01R 4/36; H01R 4/363; H01R 4/301; H01R 11/12; H01R 13/04; H01R 9/2458
(Continued)

(56) References Cited

U.S. PATENT DOCUMENTS 5,645,457 A * 7/1997 Hirayama ............ H01H 1/5855
439/801
6,322,376 B1 * 11/2001 Jetton .................... H01R 4/302
411/107
(Continued)

FOREIGN PATENT DOCUMENTS

| JP | 10-092484 | 4/1998 |
| JP | 2008-079482 | 4/2008 |
| JP | 2016-018613 | 2/2016 |

OTHER PUBLICATIONS

Official Communication issued in International Bureau of WIPO Patent Application No. PCT/JP2017/034282, dated Oct. 24, 2017.

*Primary Examiner* — Thanh Tam T Le
(74) *Attorney, Agent, or Firm* — Greenblum & Bernstein, P.L.C.

(57) ABSTRACT

An electrical connection box includes a box main body; internal circuits that are arranged and accommodated in the box main body; and a terminal fastening portion that is arranged and accommodated in the box main body, and that is provided with a first fastening tool, the electrical connection box having a plurality of connection terminal portions that are provided to the internal circuits arranged on a first seating surface of the first fastening tool, and also having the plurality of connection terminal portions fastened and fixed together with a connection terminal that is crimped to an end of an external wire, in which the plurality of connection terminal portions each include a plurality of divided terminal portions that are formed to a size that partially covers the (Continued)

first seating surface of the first fastening tool and do not overlap each other in an axis direction of the first fastening tool.

3 Claims, 10 Drawing Sheets

(51) Int. Cl.
*H01R 4/18* (2006.01)
*H02G 3/16* (2006.01)
*B60R 16/023* (2006.01)
*B60R 16/02* (2006.01)

(58) Field of Classification Search
USPC ...... 439/76.2, 782, 801, 810–814, 883, 884, 439/949
See application file for complete search history.

(56) References Cited

U.S. PATENT DOCUMENTS

| | | | | |
|---|---|---|---|---|
| 6,512,443 B1* | 1/2003 | Matsumura | .......... | H01H 85/044 337/161 |
| 7,347,733 B2* | 3/2008 | Murakami | .......... | H01H 85/044 439/620.27 |
| 7,442,099 B2* | 10/2008 | Egawa | .......... | H01R 4/34 439/76.2 |
| 7,597,595 B2* | 10/2009 | Ohashi | .......... | H01R 11/12 439/522 |
| 7,611,360 B2* | 11/2009 | Akahori | .......... | H01R 4/185 439/76.2 |
| 7,802,998 B2* | 9/2010 | Taguchi | .......... | H01R 4/305 439/76.2 |
| 7,850,462 B2* | 12/2010 | Nakagawa | .......... | H01R 11/287 439/620.27 |
| 7,893,364 B2* | 2/2011 | Oda | .......... | H05K 7/026 174/50 |
| 8,350,151 B2* | 1/2013 | Asao | .......... | H01R 13/6315 174/50 |
| 8,382,525 B2* | 2/2013 | Shiraki | .......... | H01R 11/287 439/34 |
| 8,926,246 B2* | 1/2015 | I | .......... | B60R 16/0238 411/107 |
| 8,936,421 B2* | 1/2015 | Kawamura | .......... | F16B 37/043 411/103 |
| 9,287,639 B2* | 3/2016 | Kaneko | .......... | H01R 4/34 |
| 9,502,656 B2* | 11/2016 | Joseph | .......... | C07D 491/04 |
| 9,531,089 B2* | 12/2016 | Okuhira | .......... | H01R 4/34 |
| 9,627,785 B1* | 4/2017 | Melchor Saucedo | .......... | H01R 13/506 |
| 9,937,798 B2* | 4/2018 | Matsumura | .......... | H05K 7/026 |
| 10,170,900 B2* | 1/2019 | Yamane | .......... | H02G 3/16 |
| 2016/0006142 A1 | 1/2016 | Okuhira | | |

* cited by examiner

ELECTRICAL CONNECTION BOX

FIELD OF THE INVENTION

The present invention relates to an electrical connection box that is installed in an automobile or the like, and particularly relates to an electrical connection box that is provided with a terminal fastening portion on which one of a pair of fastening tools configured by a bolt and a nut is arranged.

BACKGROUND OF THE INVENTION

Conventionally, an electrical connection box such as a fuse box or junction box has been used in an electrical system of an automobile, and increased efficiency in electrical wiring and improved ease of maintenance have been devised. In recent years, with the popularization of hybrid cars and implementation of electric automobiles, an electrical connection box having a large electric current capacity has been sought. Therefore, there has been an increase in such electrical connection boxes, which are provided with a terminal fastening portion where a nut is arranged so as to be accommodated or a bolt is provided standing upright, for example. Japanese Patent Laid-open Publication No. 2008-79482 (Patent Literature 1), for example, discloses an electrical connection box that has a structure in which an internal circuit and an external wire are electrically connected by inserting a bolt through a connection terminal portion that is provided on an end portion of a bus bar configuring a plurality of internal circuits, and meanwhile inserting the bolt through an LA terminal that is crimped to an end of a wire, then fastening and fixating the LA terminal with a nut fastened to the bolt.

Additionally, in order to adapt to an increase in number of vehicle models in recent years—that is, in order to enable smooth adaptation to circuitry changes according to different grades of automobile or the like—an electrical connection box that is to be used in multiple grades of vehicle models first undergoes design for a high-grade vehicle model, then undergoes design for a low-grade vehicle model by removing unnecessary electrical components, bus bars, or the like from the high-grade design. Accordingly, designs for multiple grades of vehicle model can be readily carried out, and adaptation to circuitry changes according to different grades of automobile or the like can be readily and rapidly performed.

However, design for the low-grade vehicle model is carried out by removing unnecessary electrical components, bus bars, or the like from the design for the high-grade vehicle model, and therefore there are cases where a gap is created in a terminal fastening portion by removing a connection terminal portion, the gap appearing in a direction of overlap of connection terminal portions through which a bolt is inserted (that is, in an axis direction of the bolt). In other words, a position at which the bus bar, for example, is arranged is determined by a bus bar mounting groove or the like of the electrical connection box, and when an unnecessary bus bar is removed, closing the gap created between connection terminal portions has been problematic. Therefore, components are fastened in a state where the connection terminal portions are tilted when fastening the nut, whereby contact resistance between the LA terminal and the connection terminal portions that are fastened between the bolt seating surface and the nut may increase and a favorable electrical connection may not be achieved.

RELATED ART

Patent Literature

Patent Literature 1: Japanese Patent Laid-open Publication No. 2008-79482

SUMMARY OF THE INVENTION

Problems to Be Solved by the Invention

The present invention was created against the backdrop of the circumstances described above, and the problem to be solved by the present invention lies in providing an electrical connection box having a novel structure that is capable of keeping contact resistance for a terminal fastening portion in a favorable state while adapting readily and rapidly to changes in circuitry.

Means for Solving the Problems

According to a first aspect of the present invention, an electrical connection box includes a box main body; internal circuits that are arranged and accommodated in the box main body; and a terminal fastening portion that is arranged and accommodated in the box main body, and that is provided with a first fastening tool configured by one of a bolt and a nut, the electrical connection box having a plurality of connection terminal portions that are provided to the internal circuits arranged on a seating surface of the first fastening tool, and also having the plurality of connection terminal portions fastened and fixed, together with a connection terminal that is crimped to an end of an external wire, between the seating surface and a second fastening tool configured by the other of the bolt and the nut and fastened by the first fastening tool, in which the plurality of connection terminal portions each include a plurality of divided terminal portions that are formed to a size that partially covers the seating surface of the first fastening tool, and the divided terminal portions are arranged in regions that do not overlap each other in an axis direction of the first fastening tool.

According to this aspect, the plurality of connection terminal portions of the internal circuits are configured to include divided terminal portions that are formed to a size that partially covers the seating surface of the first fastening tool and that are arranged in regions that do not overlap each other in the axis direction of the first fastening tool. Accordingly, when there are circuits that are selectively used depending on a vehicle model or grade, the connection terminal portions of the circuits can be configured using the divided terminal portions. As a result, even when a portion of the connection terminal portions are unnecessary for a low-grade vehicle model, the connection terminal portion is only partially removed from the seating surface of the first fastening tool, and no gap in the axis direction of the first fastening tool is created as in the conventional art. Accordingly, when the connection terminal on the end of the external wire is overlaid on an upper surface, a sufficient contact surface area can be ensured between each of the connection terminal portions and the connection terminal on the end of the external wire. Thus, each of the terminal fastening portions are reliably fastened and fixed between the seating surface of the first fastening tool and the second fastening tool, and contact resistance for the terminal fastening portion can be maintained in a favorable state while adapting readily and rapidly to changes in circuitry.

The connection terminal portion of the internal circuit may include a connection terminal portion provided to an end of a bus bar or the like, a connection terminal portion provided to a component such as a fusible link, or the like. In addition, the first fastening tool and the second fastening tool may be components that can be fastened to each other, and can employ known fastening tools such as a bolt and nut, the reverse, or the like.

Additionally, there is no need for all of the plurality of connection terminal portions that are fastened and fixed to the terminal fastening portion to be formed to a size that covers a portion of the seating surface of the first fastening tool; a configuration is also possible where, for example, a connection terminal portion of a circuit that is absolutely required in all cases has an insertion hole at the center thereof for a shaft portion of the first fastening tool, as in the conventional art, and has a shape that covers the entire seating surface, and a connection terminal portion for a circuit that is used selectively is formed to a size that partially covers the seating surface of the first fastening tool.

According to a second aspect of the present invention, in the electrical connection box according to the first aspect, the plurality of divided terminal portions include a first connection terminal portion that is formed to a size that covers one region of the seating surface of the first fastening tool that is divided in two in a diameter direction of the first fastening tool, and a second connection terminal portion that is formed to a size that covers the second region; each of the first connection terminal portion and the second connection terminal portion include a projecting portion that projects toward a mating member, and a recessed portion that accommodates the projecting portion of the mating member; and in a state where the first connection terminal portion and the second connection terminal portion are properly arranged on the seating surface, the respective projecting portion and recessed portion engage with each other.

According to this aspect, the first connection terminal portion and the second connection terminal portion are configured to a size that covers a region that is substantially half of the seating surface of the first fastening tool. Accordingly, when the connection terminal on the end of the external wire is overlaid on the seating surface of the first fastening tool, a sufficient contact surface area can be ensured between each of the divided terminal portions and the connection terminal on the end of the external wire. Moreover, in a state where the first connection terminal portion and the second connection terminal portion are properly arranged on the seating surface, the projecting portion provided to each is configured to engage with the recessed portion respectively provided to the mating member. Thus, each of the divided terminal portions have the projecting portion, and accordingly each of the divided terminal portions are arranged not only on one side of the seating surface that is divided in two in the diameter direction, but are also partially arranged on the second side, as well. Accordingly, a fastening and fixing force from the second fastening tool can stably act on both of the divided terminal portions, and an even more stable state of electrical connection can be achieved.

According to a third aspect of the present invention, in the electrical connection box according to the second aspect, the projecting portion and the recessed portion are provided as a pair on each of the first connection terminal portion and the second connection terminal portion, positioned on both sides of the diameter direction and arranged on either side of the center of the first fastening tool.

According to this aspect, the first connection terminal portion and the second connection terminal portion include the projecting portion and the recessed portion as a pair, positioned on both sides of the diameter direction and arranged on either side of the center of the first fastening tool. Accordingly, each of the divided terminal portions can have well-balanced locations where the divided terminal portions are arranged not only on one side of the seating surface that is divided in two in the diameter direction, but also partially arranged on the second side, as well, and the fastening and fixing force from the second fastening tool can even more stably act on both of the divided terminal portions.

Effect of the Invention

According to the present invention, the plurality of connection terminal portions of the internal circuits are configured to include the divided terminal portions that are formed to a size that partially covers the seating surface of the first fastening tool and that are arranged in regions that do not overlap each other in the axis direction of the first fastening tool. Accordingly, when there is a circuit that is selectively used depending on a vehicle model or grade, the connection terminal portions of the circuit can be configured using the divided terminal portions. As a result, even when a portion of the connection terminal portions are unnecessary for a low-grade vehicle model, the connection terminal portion is only partially removed from the seating surface of the first fastening tool, and no gap in the axis direction of the first fastening tool is created as in the conventional art. Accordingly, a sufficient contact surface area can be ensured between each of the connection terminal portions and the connection terminal on the end of the external wire, and therefore contact resistance for the terminal fastening portion can be kept in a favorable state while adapting readily and rapidly to changes in circuitry.

DETAILED DESCRIPTION

In the following, embodiments of the present invention are described with reference to the drawings.

Figure 1:
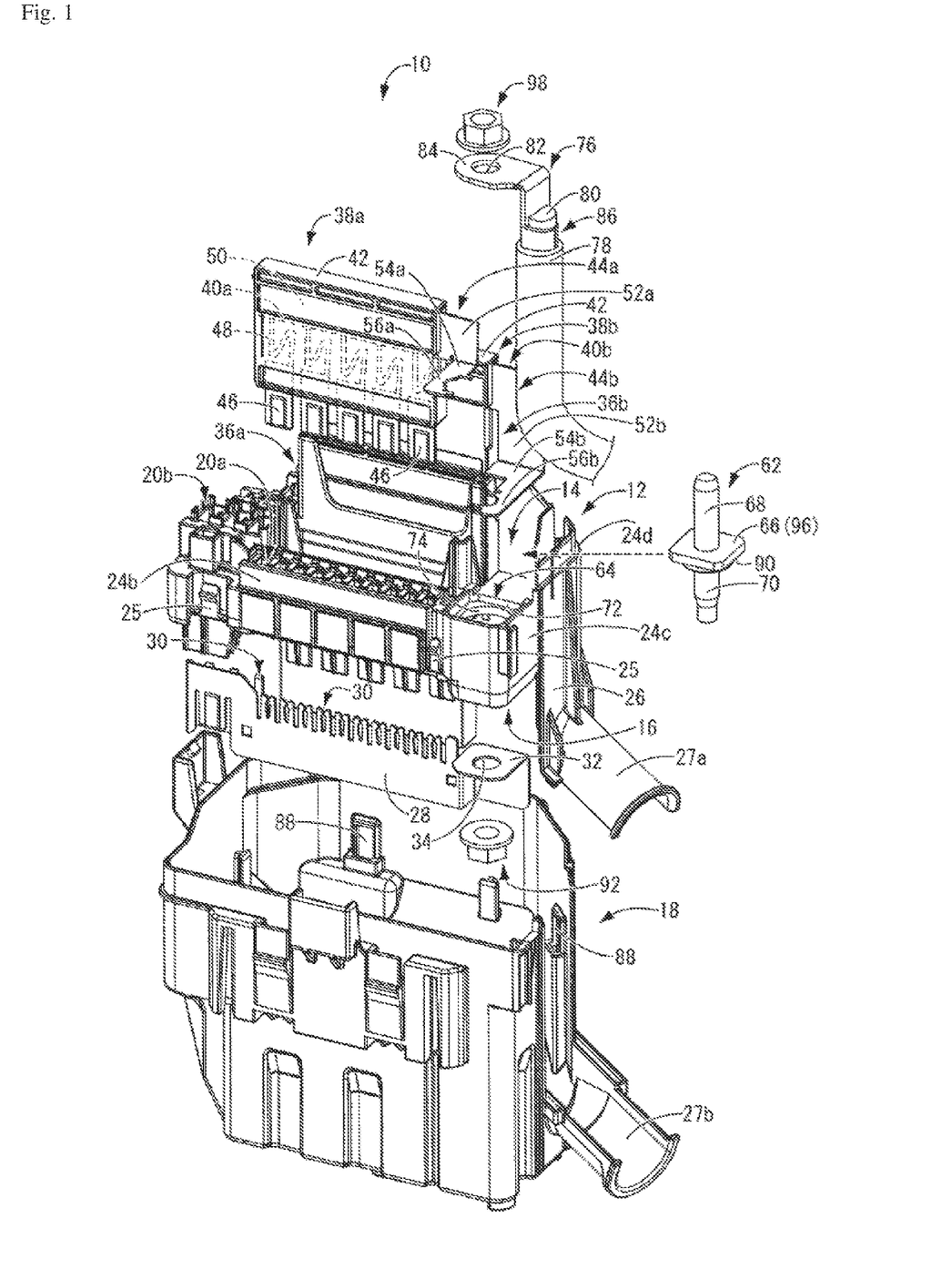
FIG. 1 is an exploded perspective view illustrating an electrical connection box as a first embodiment of the present invention.
Figure 2:
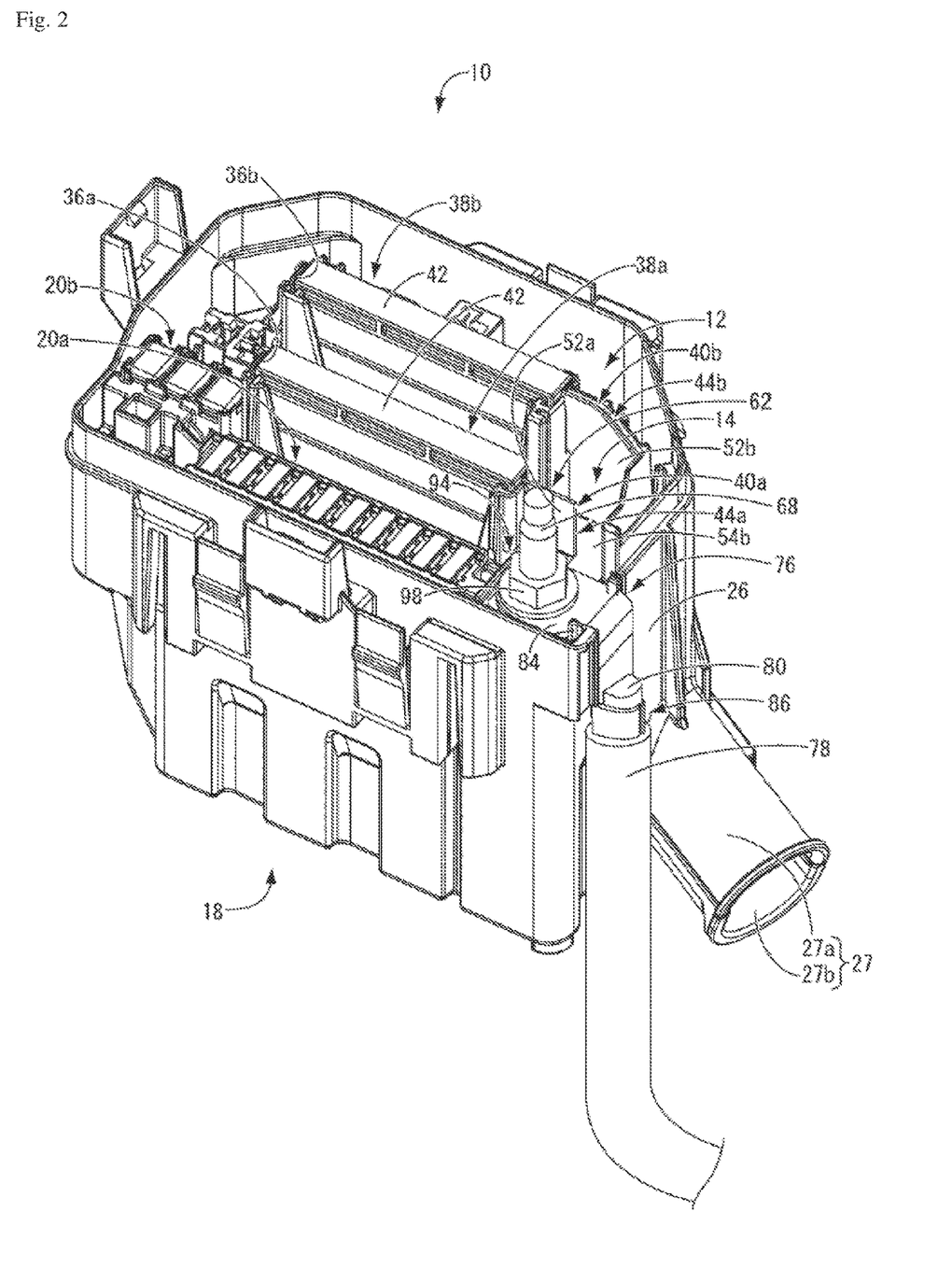
FIG. 2 is an overall perspective view of the electrical connection box illustrated in FIG. 1.

FIGS. 1 to 6 illustrate an electrical connection box 10 as a first embodiment of the present invention. As illustrated in FIG. 1, the electrical connection box 10 is configured to include a box main body 12, an upper case (not shown in the drawings) that covers an upper surface 14 of the box main body 12, and a lower case 18 that covers a lower surface 16. In the following description, up refers to up in FIGS. 1 to 3 and down refers to down in FIGS. 1 to 3; front refers to left in FIGS. 4 and 5 and rear refers to right in FIGS. 4 and 5; and a length direction refers to the left-right direction in FIGS. 4 and 5 while a width direction refers to the up-down direction in FIGS. 4 and 5.

The box main body 12 has a long, rectangular block shape overall, and is integrally formed by injection molding or the like using a synthetic resin having insulating properties, such as polypropylene (PP) or polyamide (PA), for example. A plurality of terminal mounting holes (not shown in the drawings) are bored into this box main body 12. As illustrated in FIGS. 1 to 5, multiple fuse mounting portions 20a and 20b and several relay mounting portions 22a and 22b are provided on each of a near side and far side of the width direction (up-down direction in FIGS. 4 and 5) of the upper surface 14 of the box main body 12, which has an open upper end side that corresponds to one end of the terminal mounting holes. Meanwhile, a bus bar mounting groove (not shown in the drawings) that extends across a space between the plurality of terminal mounting holes is provided on the lower surface 16 of the box main body 12, which has an open lower end side that corresponds to the other end of the terminal mounting holes. In addition, as illustrated in FIGS. 1, 4, and 5, two lock portions 25 are respectively provided, separated from each other in the length direction, to two circumferential walls 24b and 24d that face each other in the width direction of the box main body 12, whereas an extended wall portion 26 that extends downward and a substantially semi-cylindrical wire pull-out portion 27a that extends to the rear and obliquely downward from an extended end portion of the extended wall portion 26 are provided to a circumferential wall 24c of the box main body 12.

In addition, fuses and relays (not shown in the drawings) are mounted to the fuse mounting portions 20a and 20b and the relay mounting portions 22a and 22b from the upper surface 14 side of the box main body 12, and thereby tab terminals that project from the relays and fuses are arranged so as to be accommodated in the terminal mounting holes. Although not shown in the drawings, a crimped terminal, for example, that is crimped to an end of a wire conductively connected to an external electric device, electric circuit, or the like is arranged and accommodated in the terminal mounting holes from the lower surface 16 side of the box main body 12, and also a bus bar 28 that configures an internal circuit is mounted and supported on the bus bar mounting groove, and therefore the crimped terminal provided to the end of the wire or a connection terminal 30 of the bus bar 28 (described below) are connected and are configured to be conductively connected to the tab terminals that are arranged and accommodated in the terminal mounting holes.

As illustrated in FIG. 1, the bus bar 28 is a plate formed by punching and bending, for example, a conductive metal plate, and a plurality of the connection terminals 30, which are configured by tuning fork terminals or tab terminals, are provided projecting on an upper end portion of the bus bar 28. Accordingly, in a state where a base end portion of the bus bar 28 that supports these connection terminals 30 is mounted and supported on the bus bar mounting groove, the connection terminals 30 are arranged on the fuse mounting portions 20a and 20b. Also, a connection terminal portion 32 is configured on a rear end side of the base end portion of the bus bar 28 by bending and projecting in substantially a crank shape in plan view, and by an upper end side of a projecting forefront end portion being bent toward a near side. A through-hole 34 is bored in a plate thickness direction in a central portion of this connection terminal portion 32, and in a state where the base end portion of the bus bar 28 is mounted and supported on the bus bar mounting groove, the through-hole 34 of the connection terminal portion 32 is configured such that a second threaded portion 70 of a bolt 62 (a first fastening tool, described below) is inserted through the through-hole 34.

Figure 3:
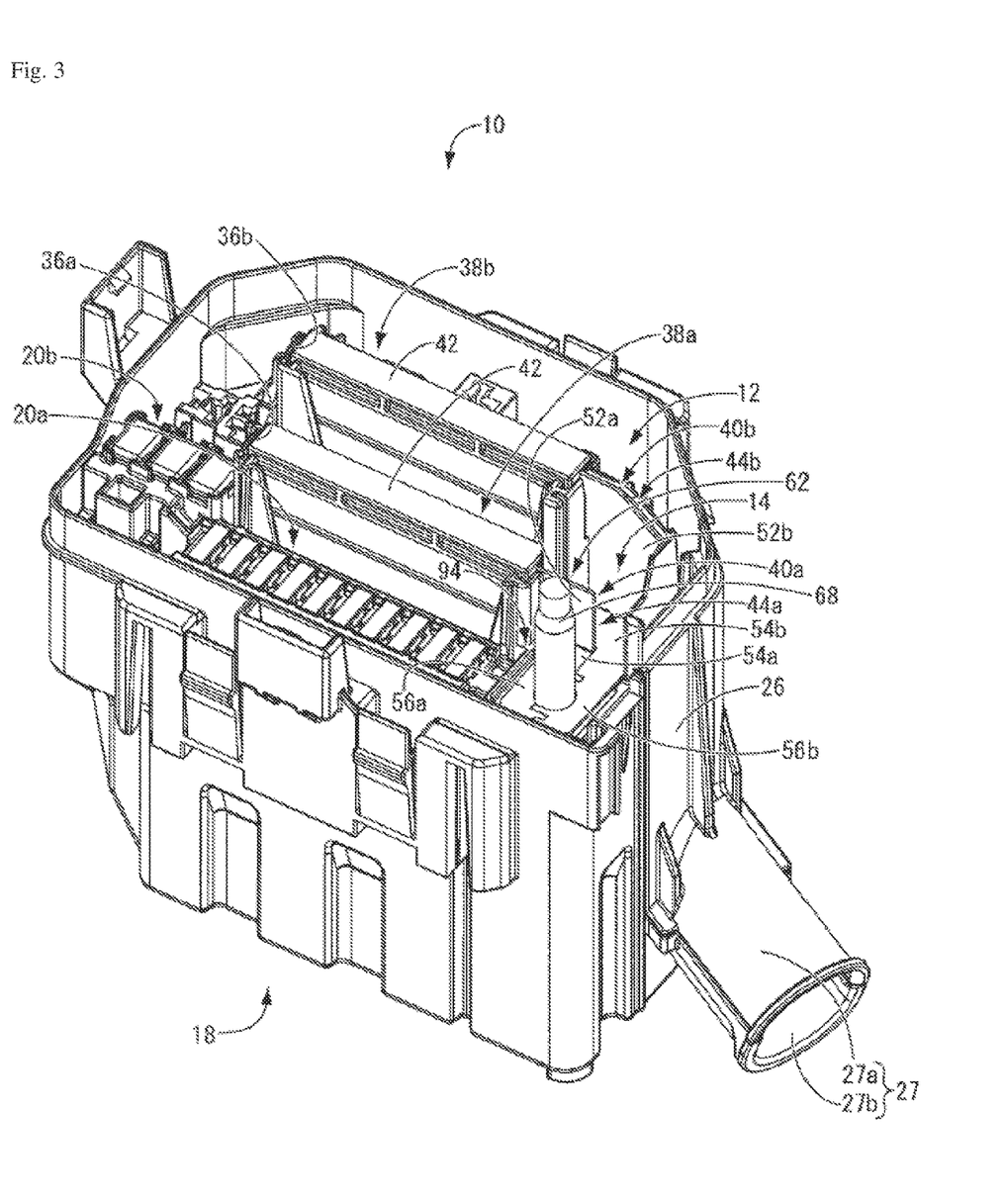
FIG. 3 is a perspective view illustrating a state where an LA terminal is removed from the electrical connection box illustrated in FIG. 2.
Figure 4:
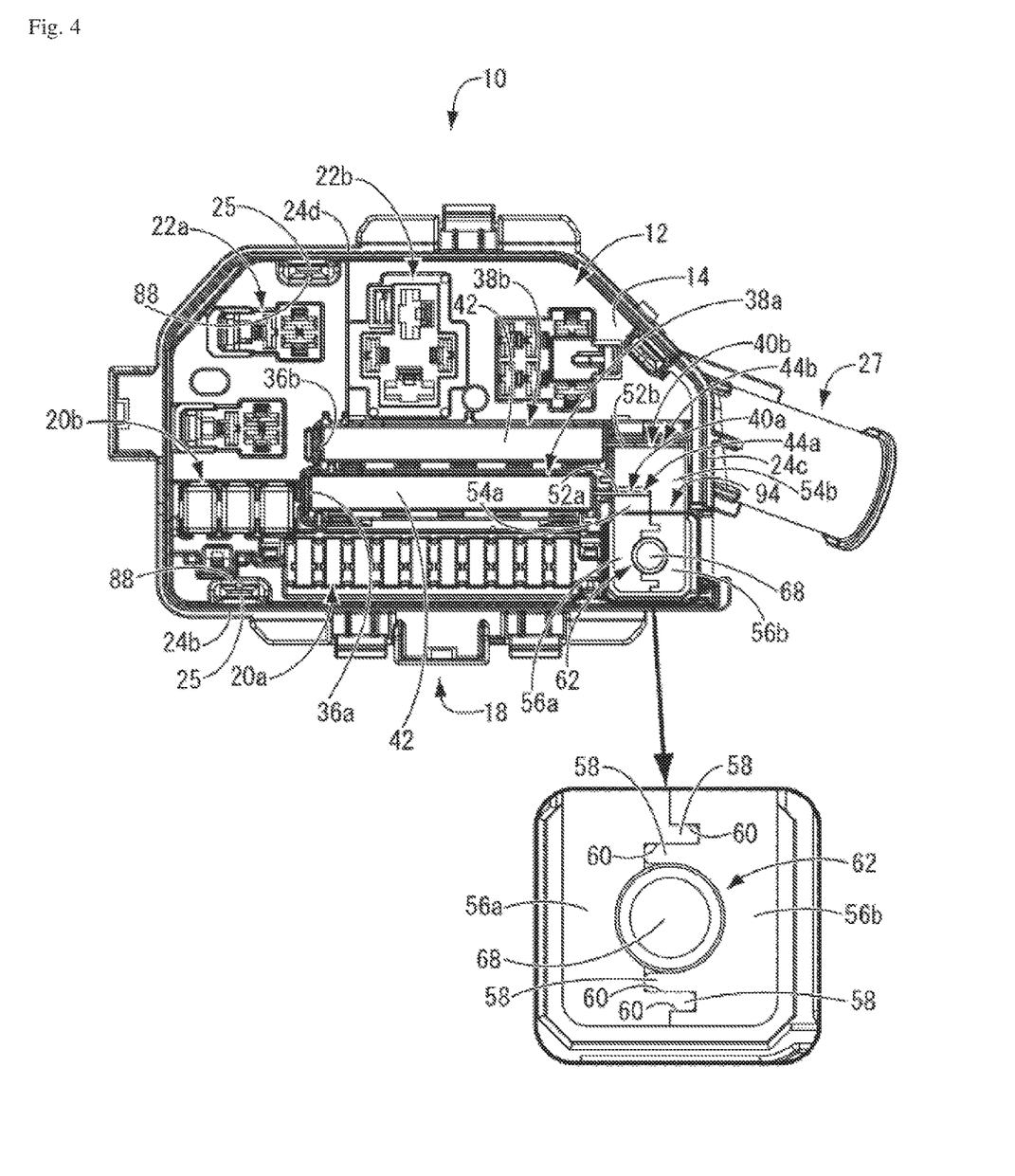
FIG. 4 is a plan view of FIG. 3.
Figure 5:
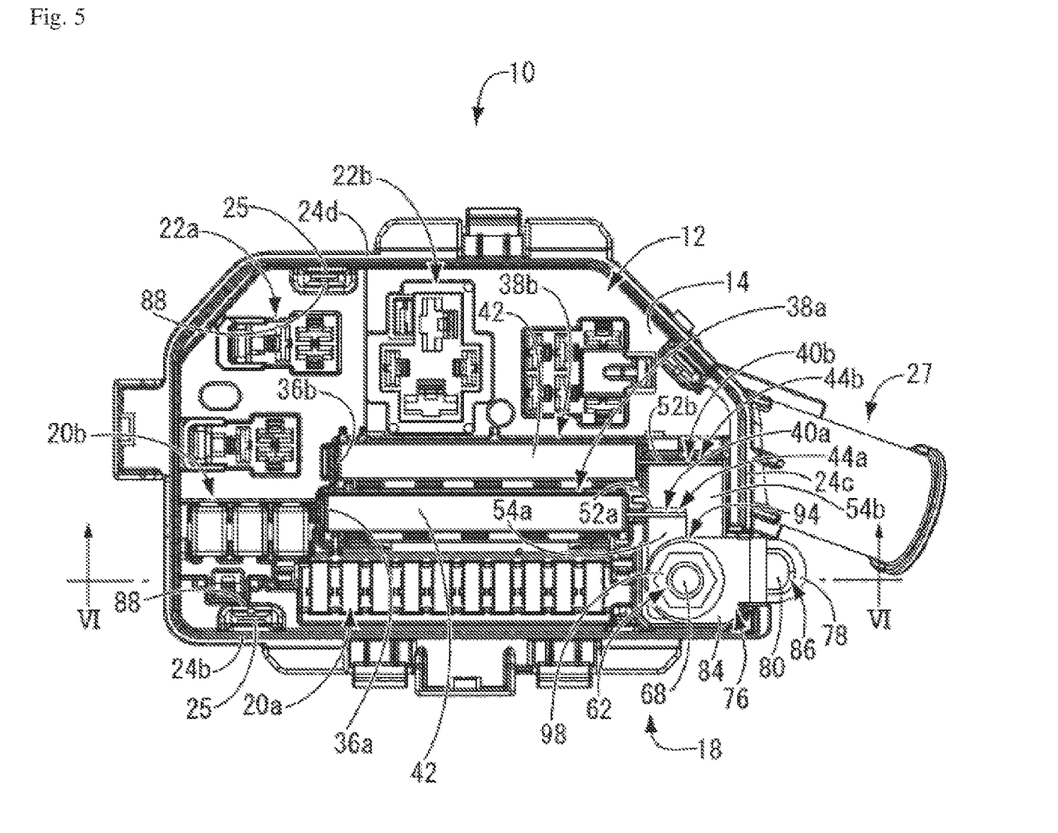
FIG. 5 is a plan view of FIG. 2.

Furthermore, as illustrated in FIGS. 1 to 5, fusible link mounting portions 36a and 36b are provided in adjacent contact with each other in the width direction (up-down direction in FIGS. 4 and 5) at a central portion of the upper surface 14 of the box main body 12. These fusible link mounting portions 36a and 36b have a substantially laterally elongated squared tube shape that opens upward and downward, and are formed so as to project from the upper surface 14 and lower surface 16 of the box main body 12. Also, fusible links 38a and 38b, which configure internal circuits, are mounted to the fusible link mounting portions 36a and 36b from the upper surface 14 side of the box main body 12 (see FIG. 1). These fusible links 38a and 38b are configured to include power source distribution bus bars 40a and 40b, and a case 42 that accommodates the power source distribution bus bars 40a and 40b. In order to facilitate understanding, only the power source distribution bus bar 40a of the fusible link 38a, shown in FIG. 1 with a dotted line, is used to describe the portion of the power source distribution bus bars 40a and 40b accommodated in the cases 42. More specifically, the power source distribution bus bars 40a and 40b, as illustrated in FIG. 1, have a configuration in which power source input terminal portions 44a and 44b and a power source branching terminal portion 46 are connected by a plate-like conductive portion 50 via a fused portion 48, and are formed by press-punching and bending a conductive metal plate. In this example, the plate-like conductive portion 50 is configured as a substantially laterally elongated rectangular plate, as viewed in a side view, that extends across substantially the entire length direction of the power source distribution bus bars 40a and 40b on an upper end side of the power source distribution bus bars 40a and 40b. The power source input terminal portion 44a is configured to include an extended portion 52a that has a substantially rectangular shape in a side view, with a rear end portion of the plate-like conductive portion 50 projecting rearward (toward the right in FIG. 4) from the case 42; and a divided terminal portion 54a, which is a connection terminal that has a substantially vertically elongated rectangular shape in a plan view and extends toward the near side (downward in FIG. 4) from a bottom end portion of the extended portion 52a. In addition, the divided terminal portion 54a is configured to include a first connection terminal portion 56a on a first seating surface 96 of a central support portion 66 of the bolt 62 (described below), the first connection terminal portion 56a being formed to a size that covers one of two regions that are divided in the diameter direction of the bolt 62 (see FIGS. 1, 3, and 4). Meanwhile, the power source input terminal portion 44b is configured to include an extended portion 52b that has substantially a hook shape in a side view, with the rear end portion of the plate-like conductive portion 50 projecting rearward (toward the right in FIG. 4) from the case 42 and then extending downward;

and a divided terminal portion 54b, which is a connection terminal that has a substantially vertically elongated rectangular shape in a plan view and extends toward the near side (downward in FIG. 4) from a bottom end portion of the extended portion 52b (see FIGS. 1, 3, and 4). In addition, the divided terminal portion 54b is configured to include a second connection terminal portion 56b on the first seating surface 96 of the bolt 62, the second connection terminal portion 56b being formed to a size that covers the second of two regions that are divided in the diameter direction of the bolt 62. As illustrated in FIG. 4, each of the first connection terminal portion 56a and the second connection terminal portion 56b are configured to include a projecting portion 58 that projects toward the mating member, and a recessed portion 60 that accommodates the projecting portion 58 of the mating member. Moreover, this projecting portion 58 and recessed portion 60 are provided as a pair on each of the first connection terminal portion 56a and the second connection terminal portion 56b, positioned on both sides of the diameter direction and arranged on either side of a shaft of the bolt 62, which is at the center of the first fastening tool.

Additionally, as illustrated in FIGS. 1 to 5, a bolt accommodation portion 64 that accommodates the bolt 62 is provided on the near side (lower right side in FIGS. 4 and 5) of the rear end portion of the upper surface 14 of the box main body 12 (see FIG. 1). As illustrated in FIG. 1, the bolt 62 is configured with first and second threaded portions 68 and 70 projecting in a rod shape in both axis directions from the central support portion 66, which has a substantially rectangular flat plate shape in a plan view. Also, the bolt accommodation portion 64 is configured to include a support portion accommodation portion 72 that opens in substantially a rectangular recessed shape on the upper surface 14 of the box main body 12; and a through-hole 74 having a substantially circular cross-sectional shape and running through a bottom wall of the support portion accommodation portion 72 at a central portion of the support portion accommodation portion 72.

As illustrated in FIG. 1, an L-shaped LA terminal 76 configuring a connection terminal is attached to the first threaded portion 68 of the bolt 62 and is fixedly connected thereto. The LA terminal 76 is used in a state of connection to a core wire 80 that is exposed at the end of an external wire 78. More specifically, the external wire 78 has a structure in which the core wire 80, where a plurality of copper, aluminum, or other metal wires (conductors) are bundled together, is covered by an insulating sheath of an ethylene-based resin, styrene-based resin, or the like having electrical insulation properties. Meanwhile, the LA terminal 76 is configured by a metal piece that is bent in an "L" shape, and a connection portion 84 having a bolt insertion hole 82 is formed at a forefront end of the LA terminal 76. In addition, a core wire crimping portion 86, where the core wire 80 that extends from the end of the external wire 78 is crimped and connected, is formed at a base end portion of the LA terminal 76.

Meanwhile, the lower case 18 that covers the lower surface 16 of the box main body 12 has substantially a box body shape that opens upward. In addition, the lower case 18 is formed in a substantially rectangular shape that is substantially identical to the lower surface 16 of the box main body 12 in a bottom view, and is integrally formed by injection molding or the like using a synthetic resin having insulating properties, such as polypropylene (PP) or polyamide (PA), for example. Locking portions 88 are provided projecting on an inner surface of circumferential walls that face each other in the width direction of this lower case 18, and by respectively engaging the locking portions 88 with the lock portions 25 on the box main body 12, the components can be locked in a state where the lower surface 16 of the box main body 12 is covered by the lower case 18. Also, a portion of a rear surface of the circumferential wall portion of the lower case 18 is cut away along substantially the entire up-down direction length, and also a substantially semi-cylindrical wire pull-out portion 27b is provided that extends rearward and obliquely downward from a bottom end portion of the notched region. Accordingly, when the lower surface 16 of the box main body 12 is covered by the lower case 18, the wire pull-out portion 27a of the box main body 12 and the wire pull-out portion 27b of the lower case 18 are fitted together and configure a wire pull-out portion 27 having a substantially cylindrical shape overall.

The electrical connection box 10 configured in this way may be assembled as follows. First, the bus bar 28 is mounted and held on the bus bar mounting groove from the lower surface 16 side of the box main body 12. Thereby, the connection terminals 30 of the bus bar 28 are arranged in the terminal mounting holes of the fuse mounting portions 20a and 20b. Next, by mounting fuses and relays (not shown in the drawings) to the fuse mounting portions 20a and 20b and the relay mounting portions 22a and 22b from the upper surface 14 side of the box main body 12, tab terminals that project from the relays and fuses are arranged so as to be accommodated in the terminal mounting holes. Thereby, one side of the tab terminal projecting from the fuse is connected to the connection terminal 30 of the bus bar 28, and meanwhile the tab terminal on the other side is connected to the crimped terminal provided at the end of the wire. Furthermore, fusible links 38a and 38b are mounted to the fusible link mounting portions 36a and 36b from the upper surface 14 side of the box main body 12, and thereby the tab terminal-shaped power source branching terminal portions 46 of the fusible links 38a and 38b project downward from the lower surface side of the fusible link mounting portions 36a and 36b. In addition, the crimped terminal provided to the end of the wire is connected to these power source branching terminal portions 46, as well. In this way, the wire extending from the crimped terminal that is connected to the tab terminal (not shown in the drawings) projecting on the lower surface 16 side of the box main body 12 and the power source branching terminal portion 46 is pulled out to the exterior through the wire pull-out portion 27 that is created when the lower surface 16 of the box main body 12 is covered by the lower case 18. As a result of the above, a plurality of the internal circuits 28, 38a, and 38b are arranged and accommodated in the box main body 12.

Figure 6:
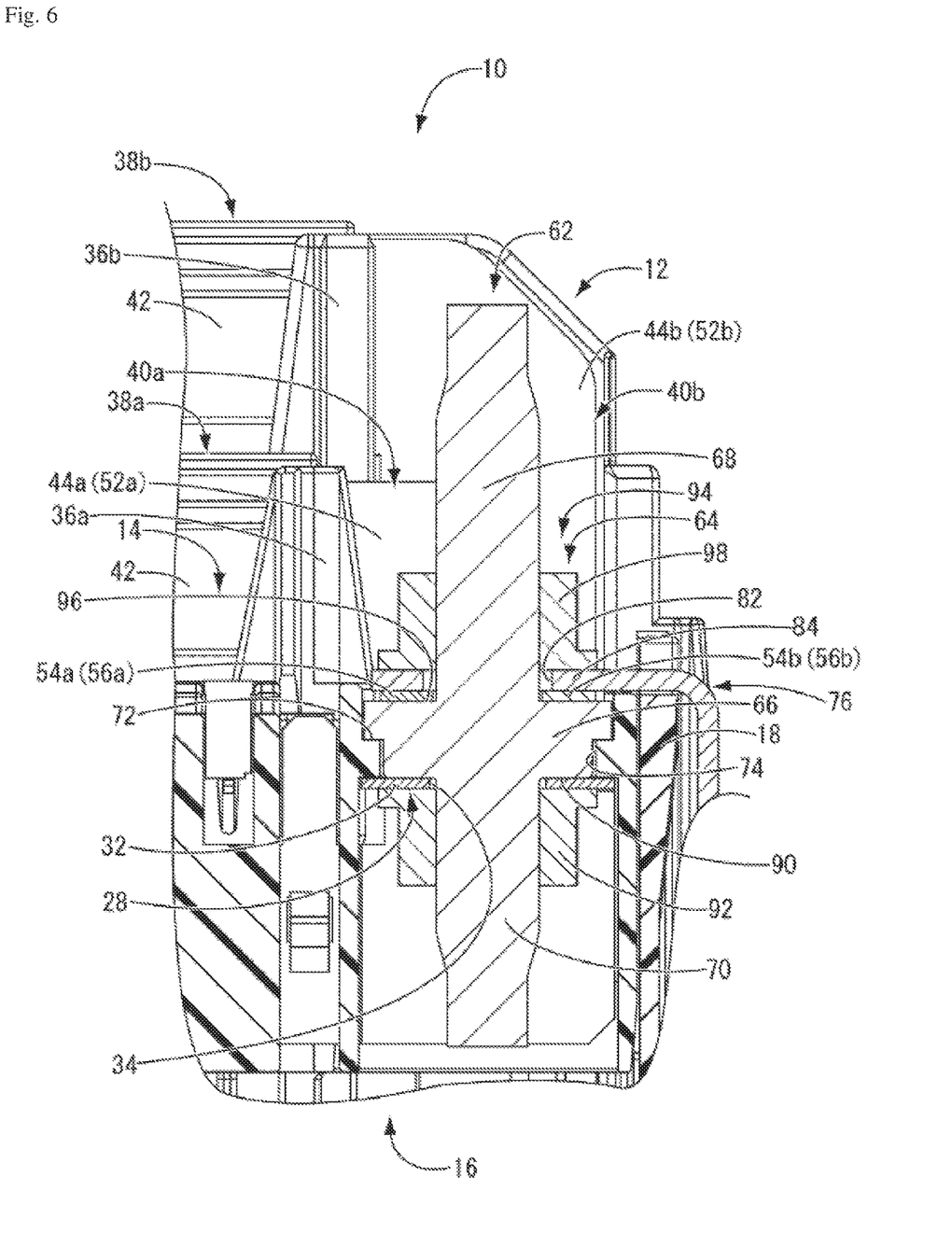
FIG. 6 is an enlarged view of relevant portions on a cross-section VI-VI in FIG. 5.
Figure 7:
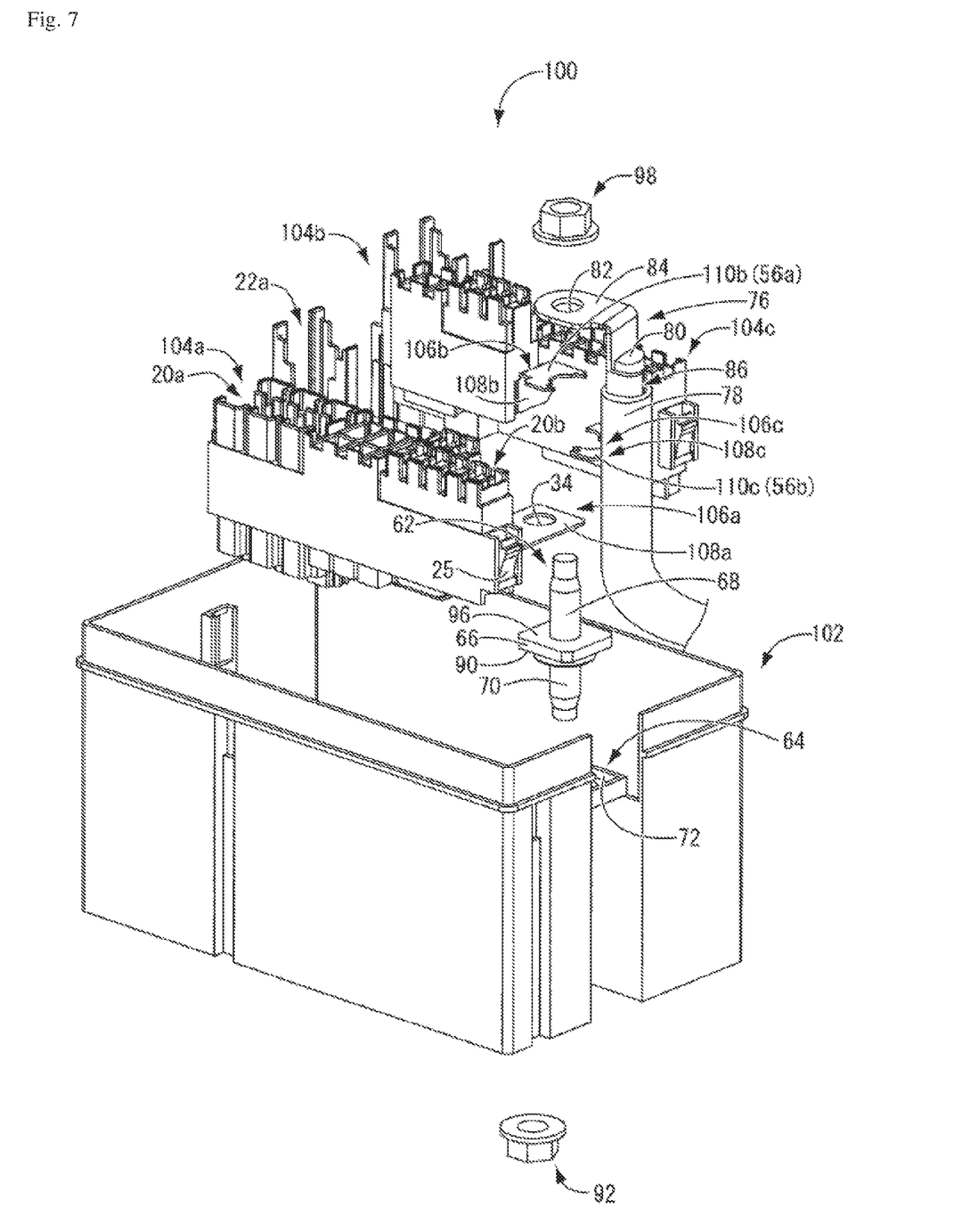
FIG. 7 is an exploded perspective view illustrating an electrical connection box as a second embodiment of the present invention.
Figure 8:
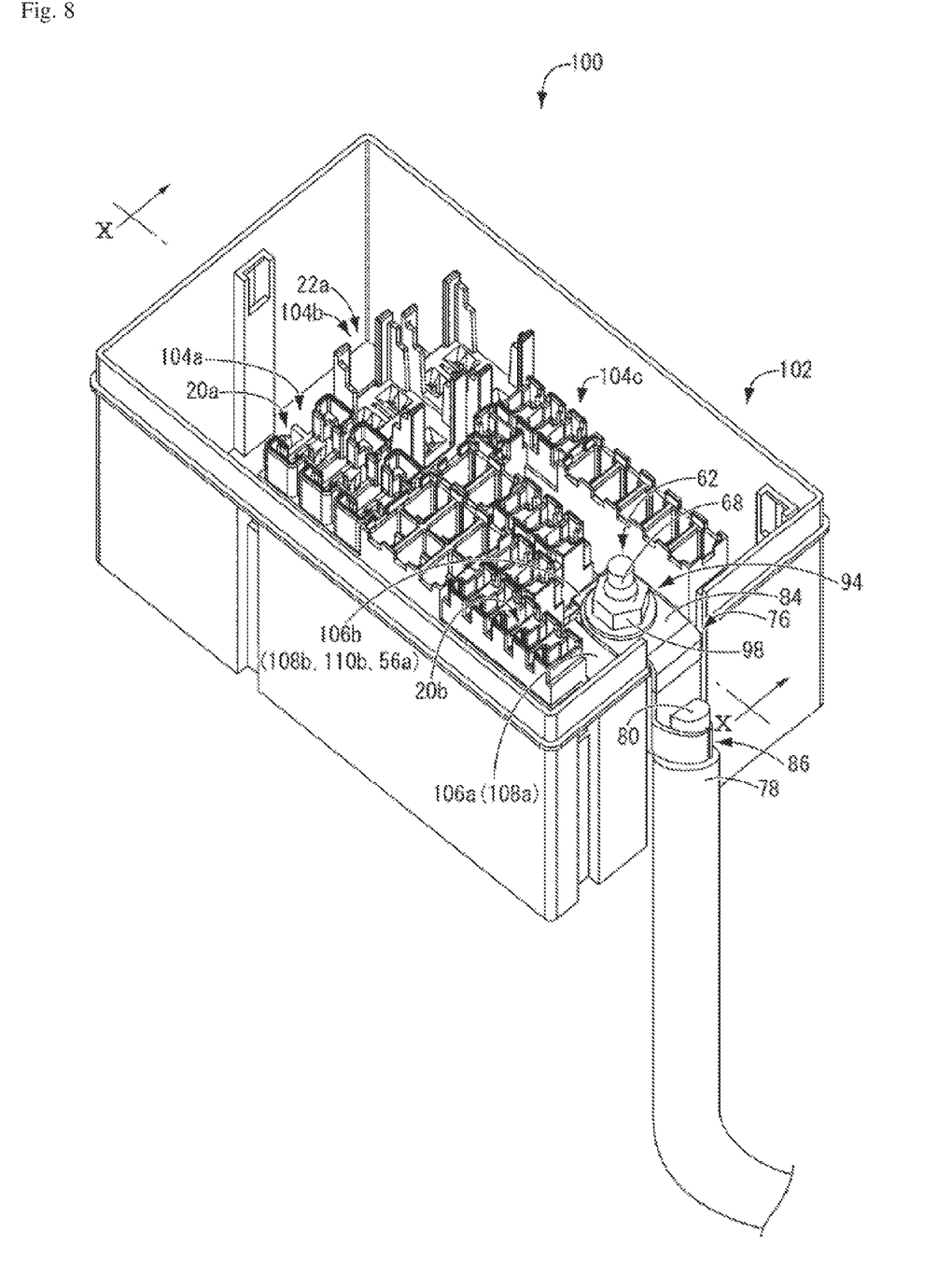
FIG. 8 is an overall perspective view of the electrical connection box illustrated in FIG. 7.

In this state, as illustrated in FIG. 6, the second threaded portion 70 of the bolt 62 is inserted through the connection terminal portion 32 of the bus bar 28 and the connection terminal portion 32 is arranged on a second seating surface 90 of the central support portion 66 of the bolt 62. Therefore, by using a nut 92 to fasten from the lower surface 16 side of the box main body 12, the bus bar 28 is connected to the bolt 62 and also the bolt 62 can be fixed to the bolt accommodation portion 64. As a result, a terminal fastening portion 94 is configured that is provided with the bolt 62 that is arranged and accommodated in the bolt accommodation portion 64 of the box main body 12. Also, in this state, the first and second connection terminal portions 56a and 56b of the divided terminal portions 54a and 54b of the power source distribution bus bars 40a and 40b are arranged on the first seating surface 96 of the central support portion 66 of the bolt 62. More specifically, as illustrated in FIGS. 1, 3, and 4, the first connection terminal portion 56a of the divided terminal portion 54a of the power source distribution bus bar 40a is arranged on a front side (left side in FIG. 4) of the first seating surface 96 of the central support portion 66, whereas the second connection terminal portion 56b of the divided terminal portion 54b of the power source distribution bus bar 40b is arranged on the rear side (right side in FIG. 4) of the first seating surface 96 of the central support portion 66. In other words, the first and second connection terminal portions 56a and 56b of the divided terminal portions 54a and 54b of the power source distribution bus bars 40a and 40b are arranged in regions that do not overlap each other in the axis direction of the bolt 62 (direction perpendicular to the plane of the drawing sheet in FIG. 4). Moreover, in a state where the first connection terminal portion 56a and the second connection terminal portion 56b are properly arranged on the first seating surface 96 in this way, the respective projecting portions 58 and recessed portions 60 of the first and second connection terminal portions 56a and 56b engage with each other (see FIG. 4). Therefore, by inserting the first threaded portion 68 of the bolt 62 through the connection portion 84 of the LA terminal 76 and using a nut 98 to fasten the members from the upper surface 14 side of the box main body 12, the power source distribution bus bars 40a and 40b and the LA terminal 76 can be stably connected to the bolt 62 in a tightly connected state. In other words, the plurality of connection terminal portions 32, 56a, and 56b provided to the internal circuits 28, 38a, and 38b are arranged on the second seating surface 90 and the first seating surface 96 of the bolt 62, and also the plurality of connection terminal portions 32, 56a, and 56b are stably fastened and fixed, together with the LA terminal 76 that is crimped to the end of the external wire, to the bolt 62 in a tightly connected state between the second seating surface 90 and the first seating surface 96 and the nuts 92 and 98 (second fastening tool) that are fastened to the bolt 62. Due to the above, the external wire 78 that is connected to the LA terminal 76 is conductively connected to a power source-side terminal of a battery (not shown in the drawings), for example, and thereby a supply voltage of the battery can be distributed via the power source branching terminal portions 46 and the connection terminal portions 32 provided to the internal circuits 28, 38a, and 38b of the electrical connection box 10 of the present embodiment. Also, lastly, the upper surface 14 of the box main body 12 is covered by the upper case (not shown in the drawings), thereby completing the electrical connection box 10 of the present embodiment.

According to the electrical connection box 10 having this structure, the divided terminal portions 54a and 54b, which are connection terminal portions of the fusible links 38a and 38b that configure internal circuits, are formed to a size that partially covers the first seating surface 96 of the bolt 62, and are arranged in regions that do not overlap each other in the axis direction of the bolt 62 (see FIGS. 4 and 6). Accordingly, when there is an internal circuit that is selectively used depending on a vehicle model or grade, the connection terminal portions of the internal circuit can be configured using the divided terminal portions 54a and 54b. Accordingly, in a case where all of the internal circuits 38a and 38b are required, the connection between the plurality of connection terminal portions 54a and 54b and the LA terminal 76 can be stably achieved with a compact configuration; meanwhile, when designing an electrical connection box for a low-grade vehicle model, even in a case where a portion of the connection terminal portions 54a and 54b is not needed, the connection terminal portions 54a and 54b are only partially removed from the first seating surface 96 of the bolt 62, and therefore no gap is created between the nut 98 and the first seating surface 96 of the bolt 62 in the axis direction of the bolt 62, as happens with a conventional structure. Accordingly, even in a case where the LA terminal 76, which is a connection terminal on the end of an external wire, is overlaid from the first seating surface 96 side and is connected and fixed to the bolt 62 using the nut 98, a sufficient contact surface area with the LA terminal 76 on the end of the external wire can be ensured for each of the connection terminal portions 54a and 54b. Thus, each of the connection terminal portions 54a and 54b are reliably fastened and fixed between the nut 98 and the first seating surface 96 of the bolt 62, therefore enabling contact resistance for the terminal fastening portion 94 to be maintained in a favorable state while adapting readily and rapidly to changes in internal circuitry.

In addition, the first connection terminal portion 56a of the divided terminal portion 54a is formed to a size that covers one of two regions that are divided in the diameter direction of the bolt 62, while the second connection terminal portion 56b of the divided terminal portion 54b is formed to a size that covers the second of the two regions that are divided in the diameter direction of the bolt 62 on the first seating surface 96 of the bolt 62. Accordingly, even in a case where the LA terminal 76 on the end of the external wire is overlaid from the first seating surface 96 side and is connected and fixed to the bolt 62 using the nut 98, a sufficient contact surface area with the LA terminal 76 on the end of the external wire can be ensured for each of the divided terminal portions 54a and 54b (see FIGS. 1 and 4), similar to a case with the conventional structure. Moreover, in a state where the first connection terminal portion 56a and the second connection terminal portion 56b are properly arranged on the first seating surface 96, the respective projecting portions 58 and recessed portions 60 of the first and second connection terminal portions 56a and 56b engage with each other (see FIG. 4). In this way, because each of the divided terminal portions 54a and 54b have the projecting portion 58, each of the divided terminal portions 54a and 54b are arranged not only on one side of the first seating surface 96 that is divided in two in the diameter direction, but are also partially arranged on the second side, as well. Thus, a fastening and fixing force from the nut 98 can stably act on both of the divided terminal portions 54a and 54b, therefore enabling contact resistance for the terminal fastening portion 94 to be maintained in a favorable state while achieving an even more stable state of electrical connection. Additionally, the projecting portion 58 and recessed portion 60 are provided as a pair on each of the first connection terminal portion 56a and the second connection terminal portion 56b, positioned on both sides of the diameter direction and arranged on either side of the bolt 62 (see FIG. 4). Accordingly, each of the divided terminal portions 54a and 54b can have well-balanced locations where the divided terminal portions 54a and 54b are arranged not only on one side of the first seating surface 96 that is divided in two in the diameter direction, but also partially arranged on the second side, as well, and therefore the fastening and fixing force from the nut 98 can even more stably act on both of the divided terminal portions 54a and 54b.

Figure 9:
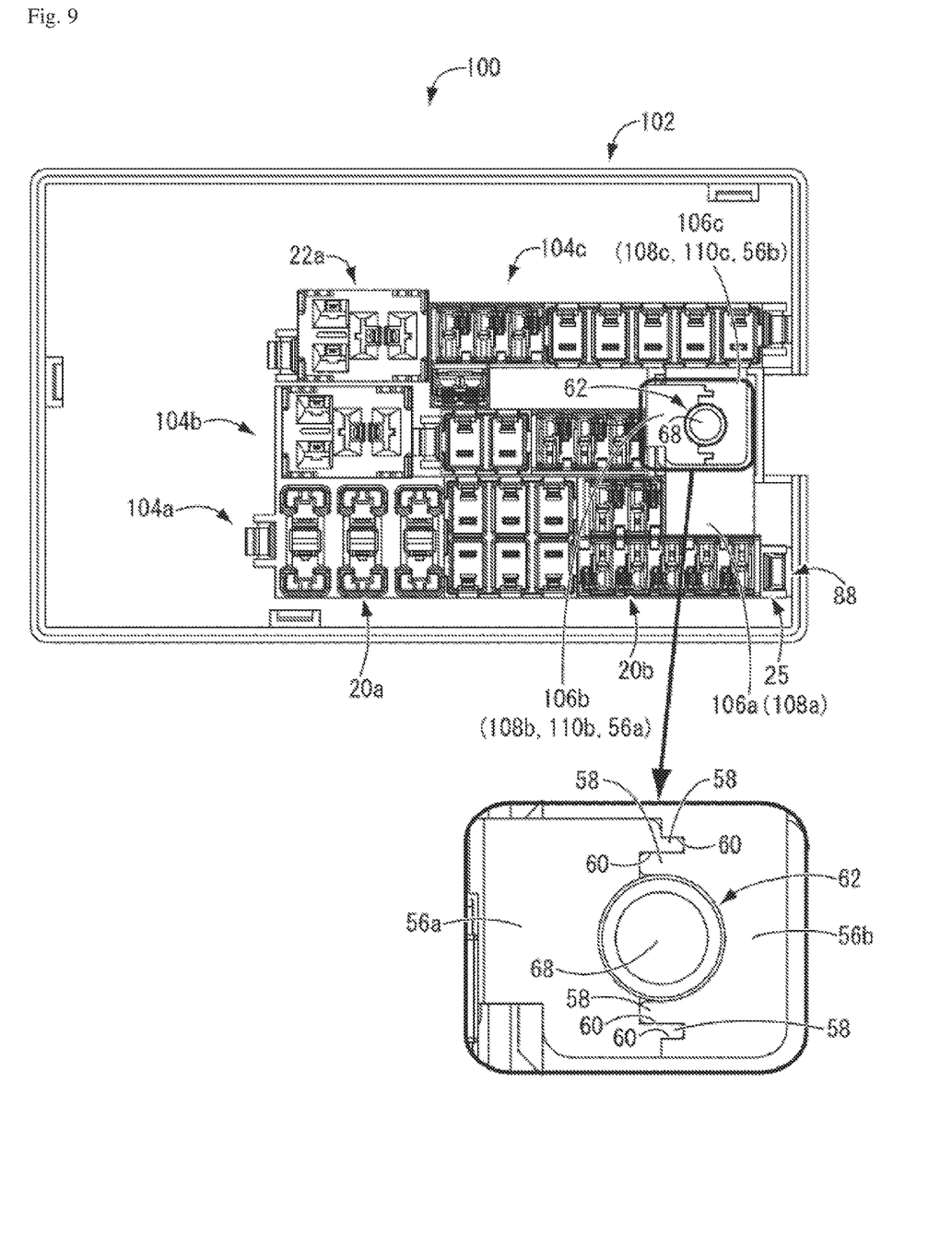
FIG. 9 is a plan view illustrating a state where an LA terminal is removed from the electrical connection box illustrated in FIG. 8.
Figure 10:
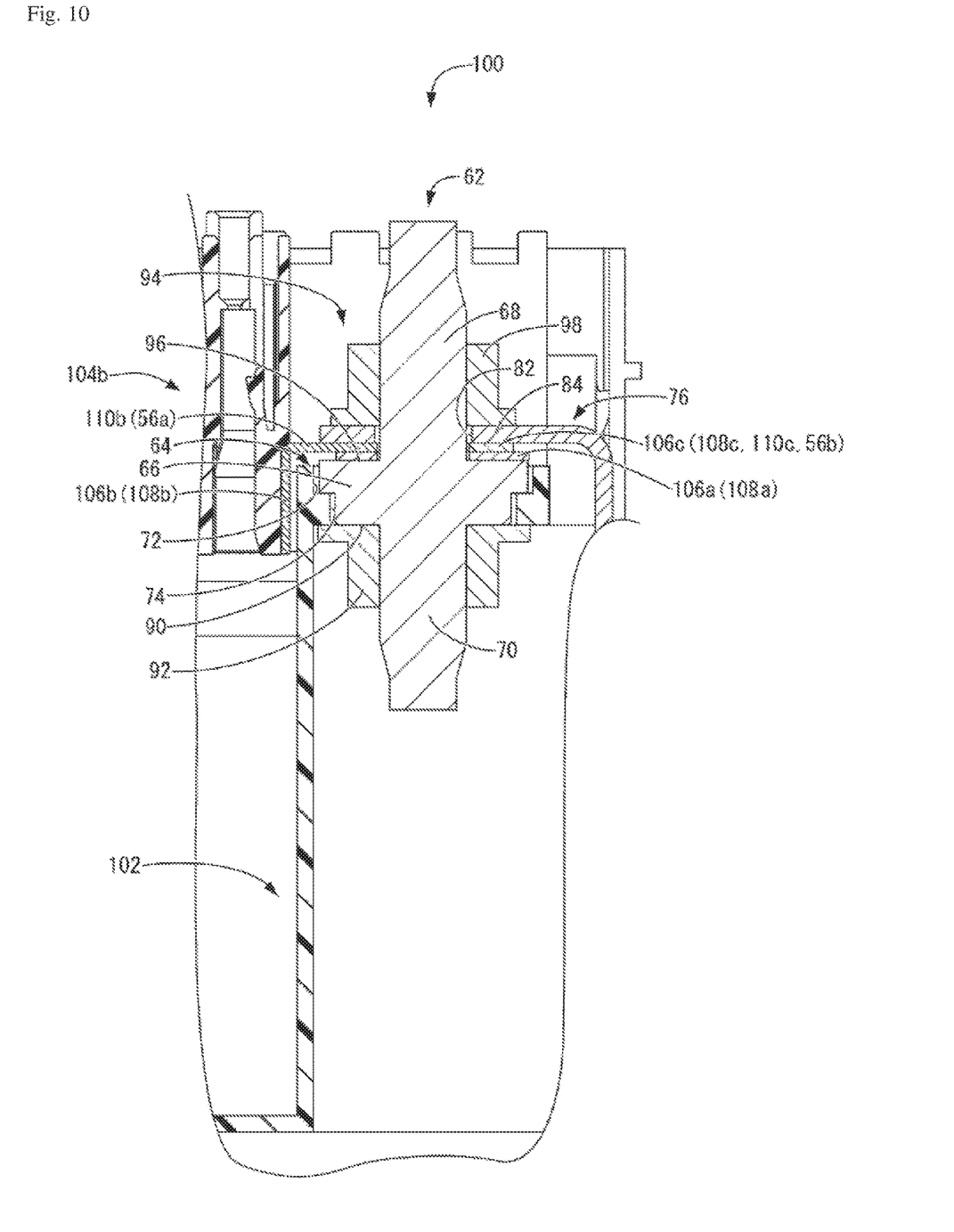
FIG. 10 is an enlarged view of relevant portions on a cross-section X-X in FIG. 8.

In the foregoing, an embodiment of the present invention is described; however, the present invention is not limited in any respect by the specific recitations in said embodiment. For example, in the first embodiment described above, the internal circuits are configured by the bus bar 28 and the fusible links 38a and 38b; however, as in an electrical connection box 100 according to a second embodiment of the present invention and illustrated in FIGS. 7 to 10, for example, the internal circuits may also be configured by bus bars 106a to 106c, which configure fuse circuits that are arranged accommodated in box main bodies 104a to 104c, which are accommodated and held in a lower case 102. More specifically, power source input terminal portions 108a to 108c of the bus bars 106a to 106c project outward in a horizontal direction on circumferential wall portions of the box main bodies 104a to 104c, and the power source input terminal portions 108b and 108c of these power source input terminal portions 108a to 108c are configured to include divided terminal portions 110b and 110c, which configure a connection terminal portion. In the present embodiment, these divided terminal portions 110b and 110c are formed to have a similar shape to the divided terminal portions 54a and 54b described in the first embodiment above. Specifically, the divided terminal portions 110b and 110c of the bus bars 106b and 106c are formed to a size that partially covers the first seating surface 96 of the bolt 62, and are arranged in regions that do not overlap each other in the axis direction of the bolt 62 (see FIGS. 9 and 10). Thus, in the present embodiment as well, similarly to the first embodiment above, each of the divided terminal portions 110b and 110c are reliably fastened and fixed between the nut 98 and the first seating surface 96 of the bolt 62, and there is therefore clearly an effect of enabling contact resistance for the terminal fastening portion 94 to be maintained in a favorable state while adapting readily and rapidly to changes in internal circuitry.

In addition, in the first and second embodiments, exemplary cases having two divided terminal portions 54a and 54b are described; however, three or more divided terminal portions may be arranged on the first seating surface 96 and second seating surface 90 of the first fastening tool (the bolt 62, for example), in regions that do not overlap each other in the axis direction of the first fastening tool. Moreover, in the first and second embodiments, the projecting portion 58 is provided to both the first connection terminal portion 56a and the second connection terminal portion 56b, but may also be provided to only one of the two. Additionally, in the first and second embodiments above, the connection terminal portions 56a and 56b constitute a portion of the plurality of connection terminal portions 32, 56a, and 56b that are fastened and fixed to the terminal fastening portions 94, and only the connection terminal portions 56a and 56b are formed to a size that covers a portion of the first seating surface 96 of the bolt 62. In other words, the connection terminal portion 32 of the internal circuit 28 that is absolutely required in all cases has the through-hole 34 at the center thereof, as in the conventional art, for insertion onto the bolt 62 and has a shape that covers the entire second seating surface 90, and the connection terminal portions 56a and 56b of the internal circuits 38a and 38b that are selectively used are formed to a size that partially covers the first seating surface 96 of the bolt 62; however, all of the connection terminal portions can also be formed to a size that covers a portion of the first seating surface 96 and the second seating surface 90 of the bolt 62 and can achieve a more compact form. Moreover, in an exemplary embodiment, a plurality of divided terminal portions may also be mounted on the second seating surface 90 side.

Also, in an exemplary embodiment, although a situation is depicted in which the first fastening tool is configured by the bolt 62 and the bolt 62 stands upright on the connection terminal portions 54a, 54b, 110b, and 110c, a situation where the first fastening tool is configured by a nut and the nut is arranged on the connection terminal portions 54a, 54b, 110b, and 110c can of course also be applied similarly to the present invention. Furthermore, in addition to the exemplary bolt 62 and nuts 92 and 98, the first fastening tool and the second fastening tool may be the reverse, for example, or can employ a known pair of first and second fastening tools.

DESCRIPTION OF REFERENCE NUMERALS 10, 100: Electrical connection box; 12, 104a to 104c: Box main body; 28, 106a to 106c: Bus bar (internal circuit); 32: Connection terminal portion; 38a, 38b: Fusible link (internal circuit); 54a, 54b, 110b, 110c: Divided terminal portion (connection terminal portion); 56a: First connection terminal portion; 56b: Second connection terminal portion; 58: Projecting portion; 60: Recessed portion; 62: Bolt (first fastening tool); 76: LA terminal (connection terminal); 78: External wire; 90: Second seating surface; 92, 98: Nut (second fastening tool); 94: Terminal fastening portion; 96: First seating surface Scope of the claims:

1. An electrical connection box comprising:
   a box main body;
   internal circuits that are arranged and accommodated in the box main body; and
   a terminal fastening that is arranged and accommodated in the box main body,
   the terminal fastening being provided with a first fastening tool configured by one of a bolt and a nut,
   the electrical connection box having a plurality of divided terminals, the plurality of divided terminals including a plurality of connection terminal portions, the plurality of connection terminal portions being provided to the internal circuits and arranged to engage with one another on a seating surface of the first fastening tool, and also having the plurality of connection terminal portions fastened and fixed, together with a connection terminal that is crimped to an end of an external wire, between the seating surface and a second fastening tool configured by the other of the bolt and the nut and fastened by the first fastening tool, and
   the plurality of divided terminals being configured to partially cover the seating surface of the first fastening tool, and the plurality of divided terminals being arranged in regions that do not overlap each other in an axis direction of the first fastening tool.

2. An electrical connection box comprising:
   a box main body;
   internal circuits that are arranged and accommodated in the box main body; and
   a terminal fastening that is arranged and accommodated in the box main body,
   the terminal fastening being provided with a first fastening tool configured by one of a bolt and a nut,
   the electrical connection box having a plurality of divided terminals, the plurality of divided terminals including a plurality of connection terminal portions, the plurality of connection terminal portions being provided to the internal circuits and arranged on a seating surface of the first fastening tool, and also having the plurality of connection terminal portions fastened and fixed, together with a connection terminal that is crimped to an end of an external wire, between the seating surface and a second fastening tool configured by the other of the bolt and the nut and fastened by the first fastening tool,
   the plurality of divided terminals being configured to partially cover the seating surface of the first fastening tool, and the plurality of divided terminals being arranged in regions that do not overlap each other in an axis direction of the first fastening tool, the seating surface of the first fastening tool being divided into first and second regions in a diameter direction of the first fastening tool, the plurality of connection terminal portions including a first connection terminal portion that is configured to cover the first region of the seating surface of the first fastening tool, and a second connection terminal portion that is configured to cover the second region, each of the first connection terminal portion and the second connection terminal portion including a projection and a recess, and in a condition in which the first connection terminal portion and the second connection terminal portion are properly arranged on the seating surface, the respective projections and recesses engage with each other.

3. The electrical connection box according to claim 2, wherein each of the first connection terminal portion and the second connection terminal portion includes a pair of the projections and a pair of the recesses, so that one projection and one recess are positioned on both sides of the diameter direction and arranged on either side of a center of the first fastening tool.

* * * * *